(12) United States Patent
Tzroya (10) Patent No.: US 8,326,735 B2
(45) Date of Patent: Dec. 4, 2012

(54) SYSTEM AND METHOD FOR PROVIDING A PLATFORM FOR THE TRADE OF EXOTIC OPTIONS

(76) Inventor: Ilan Tzroya, Ashdod (IL)

( * ) Notice: Subject to any disclaimer, the term of this patent is extended or adjusted under 35 U.S.C. 154(b) by 219 days.

(21) Appl. No.: 12/776,448

(22) Filed: May 10, 2010

(65) Prior Publication Data

US 2011/0276454 A1  Nov. 10, 2011

(51) Int. Cl.
*G06Q 40/00* (2012.01)
(52) U.S. Cl. .................... 705/37; 705/35; 705/36 R
(58) Field of Classification Search ............ 705/37, 705/35, 36 R
See application file for complete search history.

(56) References Cited

U.S. PATENT DOCUMENTS

| | | | |
|---|---|---|---|
| 7,406,443 B1* | 7/2008 | Fink et al. ................ | 705/37 |
| 2002/0147670 A1* | 10/2002 | Lange ....................... | 705/35 |
| 2004/0059655 A1* | 3/2004 | Seifert et al. ............. | 705/35 |
| 2004/0267655 A1* | 12/2004 | Davidowitz et al. ...... | 705/37 |
| 2006/0059065 A1* | 3/2006 | Glinberg et al. .......... | 705/35 |
| 2008/0177674 A1* | 7/2008 | Meir ........................ | 705/36 R |

OTHER PUBLICATIONS

Exotic options: Boundary analyses; George L Ye; Journal of Derivatives & Hedge Funds; London; Aug. 2009, vol. 15, Iss. 2; 10-pages.*
Valuing Exotic Options Used in Underwriter Compensation; Jacqueline L Garner; Beverly B Marshall; Journal of Applied Finance; 2009; 19, 1/2; 15-pages.*
Suggested Refinements to Courses on Derivatives; Christopher Deacon; Alex Faseruk; Robert Strong; Journal of Financial Management & Analysis; Jan.-Jun. 2004; 17, 1; 15-pages.*
Pricing lookback options and dynamic guarantees; Hans U Gerber; Elias S W Shiu; Griselda Deelstra; North American Actuarial Journal; Jan. 2003; 7, 1; 20-pages.*

* cited by examiner

*Primary Examiner* — Gregory Johnson
(74) *Attorney, Agent, or Firm* — Vladimir Sherman; Professional Patent Solutions (57) ABSTRACT

The present invention is a system and method for providing a platform for the trade of Exotic F.I.s. According to some embodiments of the present invention, there may be provided a server or server cluster including at least one Interfacing Server adapted to interface with a user, possibly via a distributed data network such as the internet. The IS1 may be adapted to present to a user an Exotic F.I.s trading platform, to receive from a user trade instructions and execute them. The platform may include innovative trade options including batch trade options, series trade options, parlay trade options and "close now"/"extend" options.

17 Claims, 6 Drawing Sheets

SYSTEM AND METHOD FOR PROVIDING A PLATFORM FOR THE TRADE OF EXOTIC OPTIONS

FIELD OF THE INVENTION

The present invention is generally related to the field of derivatives trading. More specifically, the present invention is related to a system and method for providing a platform for the trade of exotic options.

BACKGROUND

In finance, an exotic option is a derivative which has features making it more complex than commonly traded products (vanilla options). These products are usually traded over-the-counter (OTC), or are embedded in structured notes.

Consider an equity index. A straight call or put, either American or European would be considered non-exotic (vanilla). An exotic product could have one or more of the following features:
  The payoff at maturity depends not just on the value of the underlying index at maturity, but at its value at several times during the contract's life (it could be an Asian option depending on some average, a lookback option depending on the maximum or minimum, a barrier option which ceases to exist if a certain level is reached or not reached by the underlying, a digital option, peroni options, range options, etc.)
  It could depend on more than one index (as in a basket options, Himalaya options, Peroni options, or other mountain range options, outperformance options, etc.)
  There could be callability and putability rights.
  It could involve foreign exchange rates in various ways, such as a quanto or composite option.

Even products traded actively in the market can have the characteristics of exotic options, such as convertible bonds, whose valuation can depend on the price and volatility of the underlying equity, the credit rating, the level and volatility of interest rates, and the correlations between these factors.
Examples of exotic options include:
  Barrier
  CPPI
  Cliquet
  Compound option
  Digital/Binary option
  Lookback
  Peroni Options
  Rainbow option
  Timer call
  Unit Contingent Options
  Variance swap
  Bermudan options A binary option is a type of option where the payoff is either some fixed amount of some asset or nothing at all. The two main types of binary options are the cash-or-nothing binary option and the asset-or-nothing binary option. The cash-or-nothing binary option pays some fixed amount of cash if the option expires in-the-money while the asset-or-nothing pays the value of the underlying security. Thus, the options are binary in nature because there are only two possible outcomes. They are also called all-or-nothing options, digital options (more common in forex/interest rate markets), and Fixed Return Options (FROs) (on the American Stock Exchange).

For example, a purchase is made of a binary cash-or-nothing call option on XYZ Corp's stock struck at $100 with a binary payoff of $1000. Then, if at the future maturity date, the stock is trading at or above $100, $1000 is received. If its stock is trading below $100, nothing is received.

In the popular Black-Scholes model, the value of a digital option can be expressed in terms of the cumulative normal distribution function.

Binary option contracts have long been available Over-the-counter (OTC), i.e. sold directly by the issuer to the buyer. They were generally considered "exotic" instruments and there was no liquid market for trading these instruments between their issuance and expiration. They were often seen embedded in more complex option contracts.

In 2007, the Options Clearing Corporation proposed a rule change to allow binary options, and the Securities and Exchange Commission approved listing cash-or-nothing binary options in 2008. In May 2008, the American Stock Exchange (Amex) launched exchange-traded European cash-or-nothing binary options, and the Chicago Board Options Exchange (CBOE) followed in June 2008. The standardization of binary options allows them to be exchange-traded with continuous quotations.

Amex offers binary options on some ETFs and a few highly liquid equities such as Citigroup and Google. Amex calls binary options "Fixed Return Options"; calls are named "Finish High" and puts are named "Finish Low". To reduce the threat of market manipulation of single stocks, Amex FROs use a "settlement index" defined as a volume-weighted average of trades on the expiration day.

CBOE offers binary options on the S&P 500 (SPX) and the CBOE Volatility Index (VIX). The tickers for these are BSZ and BVZ, respectively. CBOE only offers calls, as binary put options are trivial to create synthetically from binary call options. BSZ strikes are at 5-point intervals and BVZ strikes are at 1-point intervals. The actual underlying to BSZ and BVZ are based on the opening prices of index basket members.

Both Amex and CBOE listed options have values between $0 and $1, with a multiplier of 100, and tick size of $0.01, and are cash settled.

Still, as of yet, the exotic options trading platforms available are limited and cumbersome. Therefore, a more flexible and easier to use platform for trading these options would be desirable.

SUMMARY OF THE INVENTION

Definitions

F.I.=any financial instrument which is traded on a market, e.g. stocks, bonds, currencies, options, commodities, future contracts, etc.
Exotic F.I./Exotic Option/Exotic Contract=a derivative of another F.I., which derivative has features making it more complex than commonly traded F.I. derivatives (also known as vanilla/standard options as opposed to exotic options). Examples of Exotic F.I.'s may include:
  1. Binary—Cash-or-Nothing—wherein the payoff is set to a specified fixed price if a final price of the F.I. is higher (or in other version: lower) than the strike price; while otherwise the payoff is set to zero.
  2. Binary—Asset-or-Nothing—wherein the payoff is equal to the price of the F.I. if the price of the F.I. is higher (or in other version: lower) than the strike price, while otherwise the payoff is zero.
  3. Digital—wherein the payoff is fixed after the underlying F.I. exceeds a predetermined threshold or strike price. The value of the payout is determined at the onset of the contract and does not depend on the magnitude by which the price of the underlying changes, so long as the price is beyond the pre-determined threshold.

4. Asian—wherein the payoff depends on the average price of the underlying F.I. over a certain period of time as opposed to at maturity.
5. Barrier—wherein the payoff depends on whether or not the F.I.'s price ends up within a pre-determined range.
6. Knock-In—A latent trade that begins to function as a normal trade ("knocks in") only once a certain price level is reached before expiration.
7. Knock-Out—A trade that is cancelled once a certain price is met, so if the price is reached it is as if the trade never took place.
8. One-Touch—wherein the trader is given the payout once the price of the F.I. reaches or surpasses a predetermined barrier. This type of trade allows the trader to set the value of the barrier, the time of expiration and the payout to be received once the barrier is broken. Only two outcomes are possible with this type of trade: either the barrier is breached and the trader collects the full payout agreed upon at the outset of the trade, or the barrier is not breached and the trader loses the full premium. It should be noted that this type of trade is useful for traders who believe that the price of the F.I. will exceed a certain level in the future, but who are not sure that the higher price level is sustainable. Because a one touch trade only has one barrier level, it is generally slightly less expensive than a double one touch.
9. Double One-Touch—wherein the trader is given an agreed upon payout if the price of the F.I. reaches or passes one of two predetermined barrier levels, one of which is lower than the current price and one of which is higher. A trader is able to determine the position of both barriers, the time to expiration, and the payout to be received if the price does rise above one of the barriers. Either one of the barrier levels must be breached prior to expiration for the trade to become profitable and for the buyer to receive the payout. If neither barrier level is breached prior to expiration, the trade expires worthless and the player loses all the premium. This type of trade is useful for traders who believe the price of the F.I. will undergo a large price movement, but who are unsure of the direction.
10. Double No-Touch—wherein the trader is given an agreed upon payout if the price of the F.I. does not reach or pass one of two predetermined barrier levels, one of which is lower than the current price and one of which is higher. A trader performing this type of trade pays a premium and in turn receives the right to choose the position of the barriers, the time of expiration, and the payout to be received if the price fails to breach either barrier. The maximum possible loss is the cost of setting up the trade. A double no-touch trade is the opposite of a double one-touch trade. This type of trade is useful for a trader who believes that the price of the F.I. will remain range bounded over a certain period of time.
11. Up-and-out: wherein a spot price starts below the barrier level and has to move up for the trade to be knocked out.
12. Down-and-out: wherein a spot price starts above the barrier level and has to move down for the trade to become null and void.
13. Up-and-in: wherein spot price starts below the barrier level and has to move up for the trade to be activated.
14. Down-and-in: wherein spot price starts above the barrier level and has to move down for the trade to be activated.
15. Ladder—wherein locks-in gains once the underlying F.I. reaches predetermined price levels or "rungs", guaranteeing some profit even if the F.I. falls back below these levels before the trade expires.
16. Lookback—wherein traders are allowed to "look back" at the underlying prices occurring over the life of the trade and then trade based on the F.I.'s optimal value. This type of trade reduces uncertainties associated with the timing of market entry. There are two types of lookback trades: a fixed lookback trade, wherein the trade's strike price is fixed at purchase, though the trade is not executed at the market price: in the case of a call, the trader can look back over the life of the trade and choose to execute the trade at the point when the F.I. was priced at its highest over the life of the trade; and a floating lookback trade, wherein the trade's strike price is fixed at maturity. While lookback trades are appealing to traders, they can be expensive and are also considered to be quite speculative.
17. Shout—wherein the trader is allowed to lock in a defined profit while maintaining the right to continue participating in gains without a loss of locked-in moneys. "Shout" can be structured so that traders have more than one opportunity to "shout" or lock in profits. This allows traders to continue to benefit from positive market movements without the possibility of losing already locked-in profits.
18. Quantity-Adjusting ("Quanto")—A cash-settled, cross-currency derivative in which the F.I. is denominated in a currency other than the currency in which the trade is settled. Traders will trade using Quantos when they believe that the F.I. will do well in another country but fear that country's currency will not.

It is noted that those trades are also known as "strike" trades.

Broker=a financial instruments trading service provider.

Market data provider=a source which provides information relating to the trading of F.I.'s on one or more exchanges which provide platforms for trading of F.I.'s, e.g. price, trade volume, price fluctuation, etc.

Remote Devices=any device including a display and a user interface and adapted to communicate over a distributed data network, such as the internet (e.g. mobile phones).

The present invention is a system and method for providing a platform for the trade of Exotic F.I.s. According to some embodiments of the present invention, there may be provided a server or server cluster including at least one Interfacing Server (hereby—"IS1") adapted to interface with a user, possibly via a distributed data network such as the internet. The IS1 may be adapted to present to a user an Exotic F.I.s trading platform as described below and to receive from a user trade instructions and execute them. The server cluster may further comprise, a transaction server, an accounts database, a F.I. related data database, an operational database, a trading module, a F.I. related data analyzer, a gateway and/or any other server types functionally relevant to Exotic F.I.s trading. The servers within the cluster may each be functionally associated with a communication module which in turn may be functionally associated with the gateway and adapted to relay communications from/to the one or more servers over a distributed data network, such as the internet. Any and all computational architecture known today or to be devised in the future may be applicable to the present invention.

It should be understood by one of skill in the art that the servers and/or server cluster may reside in one or a set of physical servers and possibly across sets of redundant physical servers.

According to some embodiments of the present invention, the IS1 may be adapted to present to a user, on (1) a remote device or (2) a user interface connected directly to the IS1, a platform for trading Exotic F.I.s, as described below. The code for the platform may be stored on the operational database functionally associated with the IS1. It should be clear to one of ordinary skill in the art, that one or more of the functions described as being performed by a server (e.g. the IS1) may be performed by an application instanced on the user's remote device, which application may be pre-installed on the user's remote device or downloaded to the device by the IS1 as needed.

The platform may include options for a user to view data relating to F.I.'s, the parameters of their trade on different exchanges, parameters relating to Exotic F.I.s and their trade and any other data relevant to the trade of Exotic F.I.s.

The data may be relayed to the user directly from a market data provider and/or may be stored on the F.I. related data database and retrieved by the IS1 when needed. The platform may further include options for a user to view results of analyses of the data designed specifically for the platform and performed by the F.I. related data analyzer. The data may be displayed to the user in different forms, e.g. graphs, lists, charts, tables etc. The IS1 may be adapted to create different visual forms of the raw data for this purpose (e.g. the IS1 may be adapted to create graphs from lists of parameters).

According to some embodiments of the current invention, the IS1, possibly in conjunction with the F.I. data analyzer, may be adapted to modify the data (e.g. prices) displayed to the user so as to factor in a commission for the system's proprietor. The IS1 may be further adapted to display said commission's rate to the user on the platform. Accordingly, every trade performed for the user by the system may inherently result in the user being charged said commission.

According to some embodiments of the present invention, the platform presented to the user may include options to trade Exotic F.I.s, such as binary options. The platform may allow a user to first define parameters relating to the Exotic F.I. he wishes to trade and accordingly calculate, possibly in conjunction with the F.I. related data analyzer, and present to the user the possible outcomes of his prospective trade. Parameters relating to the Exotic F.I. may include: (1) the expiration time, (2) the amount traded, i.e. amount risked, (3) the nature of the option, i.e. buy or sell, (4) the type of option, e.g. binary, (5) the underlying asset, e.g. Google and (6) any other relevant parameter. According to further embodiments of the present invention, the platform may allow the user to define multiple trades to be executed simultaneously, which may include one or more common parameters, such as a common expiration time.

According to further embodiments of the present invention, the platform may also allow a user to extend/shorten the expiration time of an Exotic F.I. already purchased for a fee, which fee may be pre-defined or calculated specifically for each instance.

According to yet further embodiments of the present invention, the platform may also include a "Rollover" option, which may allow a user to order a sequence of similar or identical trades, wherein the user may define the number of trades to be executed sequentially or to define a target profit and instruct the system to continue executing the defined trade sequentially until the target profit is gained or all the money risked is lost.

Actions taken by the user within the platform may be translated by the IS1 into trade orders, which trades orders may then be performed by ordering the trades from a broker and/or directly by the trading module. Orders for trade of Exotic F.I.s may be performed by trading Exotic F.I.s on the market or the IS1, possibly in conjunction with the F.I. related data analyzer and/or the trading module, may be further adapted to communicate trade instructions of other F.I.'s to brokers and/or the trading server, so as to build positions in the market equivalent to the Exotic F.I.s traded—i.e. to purchase, sell or otherwise trade F.I.'s so that any gains or losses accrued by the user in his use of the system will be gained or lost in the market.

The IS1 may be further adapted to calculate the taxes owed by the user for any profits gained while trading on the system and may be even further adapted to withhold these taxes from the user's account.

While trading, a user may be accorded "leverage" by the system based on: (1) the funds he/she has deposited, (2) the specific F.I. being traded, (3) the quantity of the F.I. being traded, (4) the amount risked in a specific trade (5) predefined criteria, and/or by (6)specific allowance from an administrator of the system or his/her agent. According to further embodiments of the present invention, the system may be associated with security accounts, which security accounts may be dedicated to secure greater leverage from brokers when trading F.I.'s via said brokers, i.e. augmenting the user's deposited funds in order to obtain a larger "margin".

The IS1 may be functionally associated with an accounts database, which accounts database may contain data relating to each specific user and the funds he/she has available in his/her account. The IS1 may be adapted to update the data contained within the accounts database based on a user's activity on the platform. The IS1 may be further associated with a transaction server adapted to facilitate monetary transactions between a user and the system, i.e. deposit and withdrawal of funds to/from his/her account.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Terms in this application relating to distributed data networking, such as send or receive, may be interpreted in reference to Internet protocol suite, which is a set of communications protocols that implement the protocol stack on which the Internet and most commercial networks run. It has also been referred to as the TCP/IP protocol suite, which is named after two of the most important protocols in it: the Transmission Control Protocol (TCP) and the Internet Protocol (IP), which were also the first two networking protocols defined. Today's IP networking represents a synthesis of two developments that began in the 1970s, namely LANs (Local Area Networks) and the Internet, both of which have revolutionized computing.

The Internet Protocol suite—like many protocol suites—can be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP reference model consists of four layers.

Layers in the Internet Protocol Suite

The IP suite uses encapsulation to provide abstraction of protocols and services. Generally a protocol at a higher level uses a protocol at a lower level to help accomplish its aims. The Internet protocol stack has never been altered, by the IETF, from the four layers defined in RFC 1122. The IETF makes no effort to follow the seven-layer OSI model and does not refer to it in standards-track protocol specifications and other architectural documents.

| | |
|---|---|
| 4. Application | DNS, TFTP, TLS/SSL, FTP, Gopher, HTTP, IMAP, IRC, NNTP, POP3, SIP, SMTP, SNMP, SSH, TELNET, ECHO, RTP, PNRP, rlogin, ENRP Routing protocols like BGP, which for a variety of reasons run over TCP, may also be considered part of the application or network layer. |
| 3. Transport | TCP, UDP, DCCP, SCTP, IL, RUDP |
| 2. Internet | Routing protocols like OSPF, which run over IP, are also to be considered part of the network layer, as they provide path selection. ICMP and IGMP run over IP and are considered part of the network layer, as they provide control information. IP (IPv4, IPv6) ARP and RARP operate underneath IP but above the link layer so they belong somewhere in between. |
| 1. Network access | Ethernet, Wi-Fi, token ring, PPP, SLIP, FDDI, ATM, Frame Relay, SMDS |

It should be understood that any topology, technology and/or standard for computer networking (e.g. mesh networks, infiniband connections, RDMA, etc.), known today or to be devised in the future, may be applicable to the present invention.

The present invention is a system and method for providing a platform for the trade of Exotic F.I.s. According to some embodiments of the present invention, there may be provided a server or server cluster including at least one Interfacing Server (hereby—"IS1") adapted to interface with a user, possibly via a distributed data network such as the internet. The IS1 may be adapted to present to a user an Exotic F.I.s trading platform as described below and to receive from a user trade instructions and execute them. The a server or server cluster may further comprise, a transaction server, an accounts database, a F.I. related data database, an operational database, a trading module, a F.I. related data analyzer, a gateway and/or any other server types functionally relevant to Exotic F.I.s trading. The servers within the cluster may each be functionally associated with a communication module which in turn may be functionally associated with the gateway and adapted to communicate with one or more of the other components of the system and to relay through the gateway communications from/to the one or more servers over a distributed data network, such as the internet. Any and all computational architecture known today or to be devised in the future may be applicable to the present invention.

It should be understood by one of skill in the art that the servers and/or server cluster may reside in one or a set of physical servers and possibly across sets of redundant physical servers.

According to some embodiments of the present invention, the IS1 may be adapted to present to a user, upon a remote device (such as but not limited to, a personal computer (PC), an Internet website, a cellular phone, an Interactive television and/or any other remote device) or on a user interface connected directly to the IS1, a platform for trading Exotic F.I.s, as described below. The code for the platform may be stored on the operational database functionally associated with the IS1. It should be clear to one of ordinary skill in the art, that one or more of the functions described as being performed by a server (e.g. the IS1) may be performed alternatively by an application instanced on the user's remote device, which application may be pre-installed on the user's remote device or downloaded to the device by the IS1 as needed.

The platform may include multiple display options for a user to view data relating to F.I.'s, the parameters of their trade on different exchanges, parameters relating to Exotic F.I.s and their trade and any other data relevant to the trade of Exotic F.I.s. The IS1 may be adapted to acquire, directly, or through a third party, from market data providers, brokers and/or the trading server data relating to the trade of F.I.'s on one or more exchanges which provide markets for the trading of F.I.'s. The data may be relayed to the user directly from a market data provider and/or may be stored on the F.I. related data database and retrieved by the IS1 when needed. The platform may further include one or more options for a user to view results of analyses of said data designed specifically for the platform, which analyses may be performed by the IS1 and/or the F.I. related data analyzer, automatically and/or in response to a request from the user. The F.I. related data analyzer may be adapted to analyze data according to any known F.I. behavioral model and/or compare different characteristics of different F.I.'s. The platform may further provide for a user to define parameters of the data and/or analyses he wishes to view, e.g. the platform may allow the user to choose which F.I.'s to include in the display, time periods, type of analyses, etc. The data may be displayed to the user, possibly by user choice, in different forms, e.g. graphs, lists, charts, tables etc. The IS1 may be adapted to create different visual forms of raw data for this purpose (e.g. the IS1 may be adapted to create graphs from lists of parameters).

According to some embodiments of the current invention, the IS1, possibly in conjunction with the F.I. data analyzer, may be adapted to modify the data (e.g. prices) displayed to the user so as to factor in a commission for the system's proprietor. The IS1 may be further adapted to display said commission's rate to the user on the platform. Accordingly, every trade performed for the user by the system may inherently result in the user being charged said commission.

Figure 1:
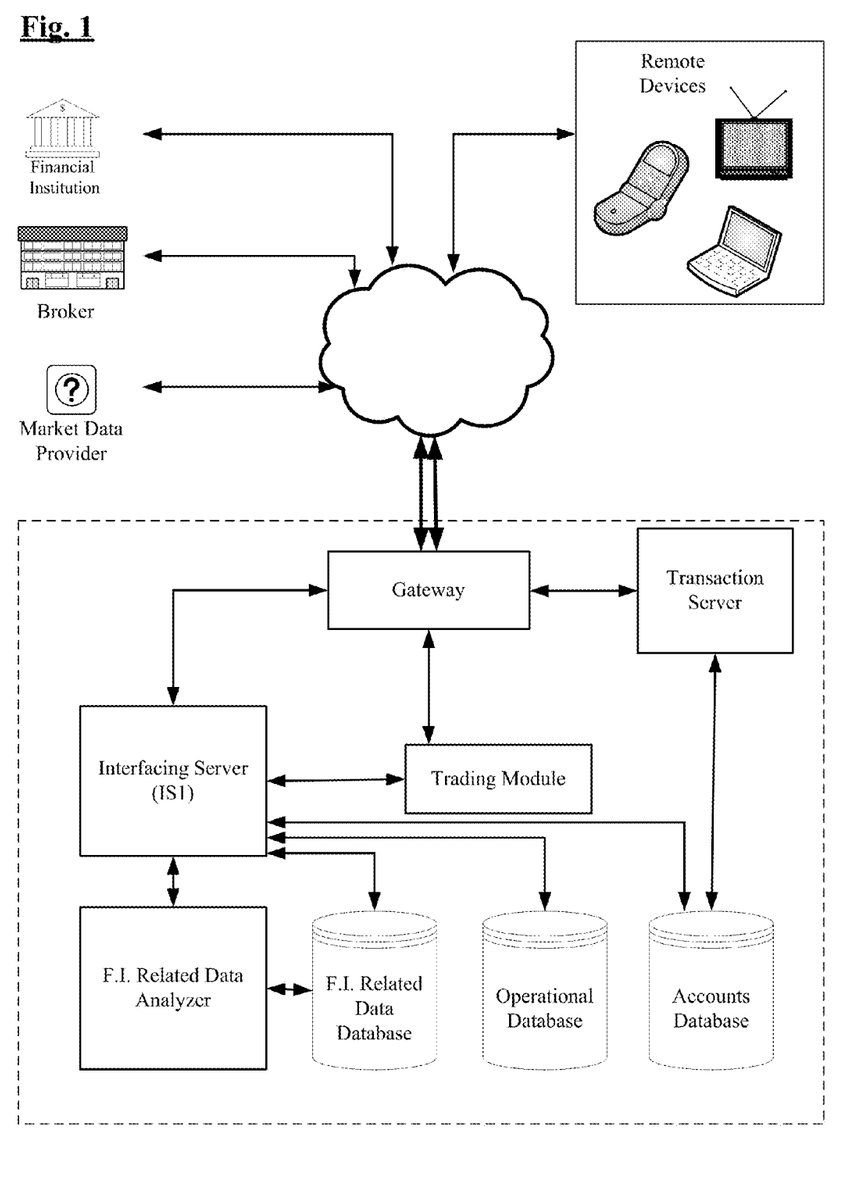
FIG. 1: is a block diagram of an exemplary system for providing a platform for the trade of exotic F.I.'s, in accordance with some embodiments of the present invention.
Figure 2:
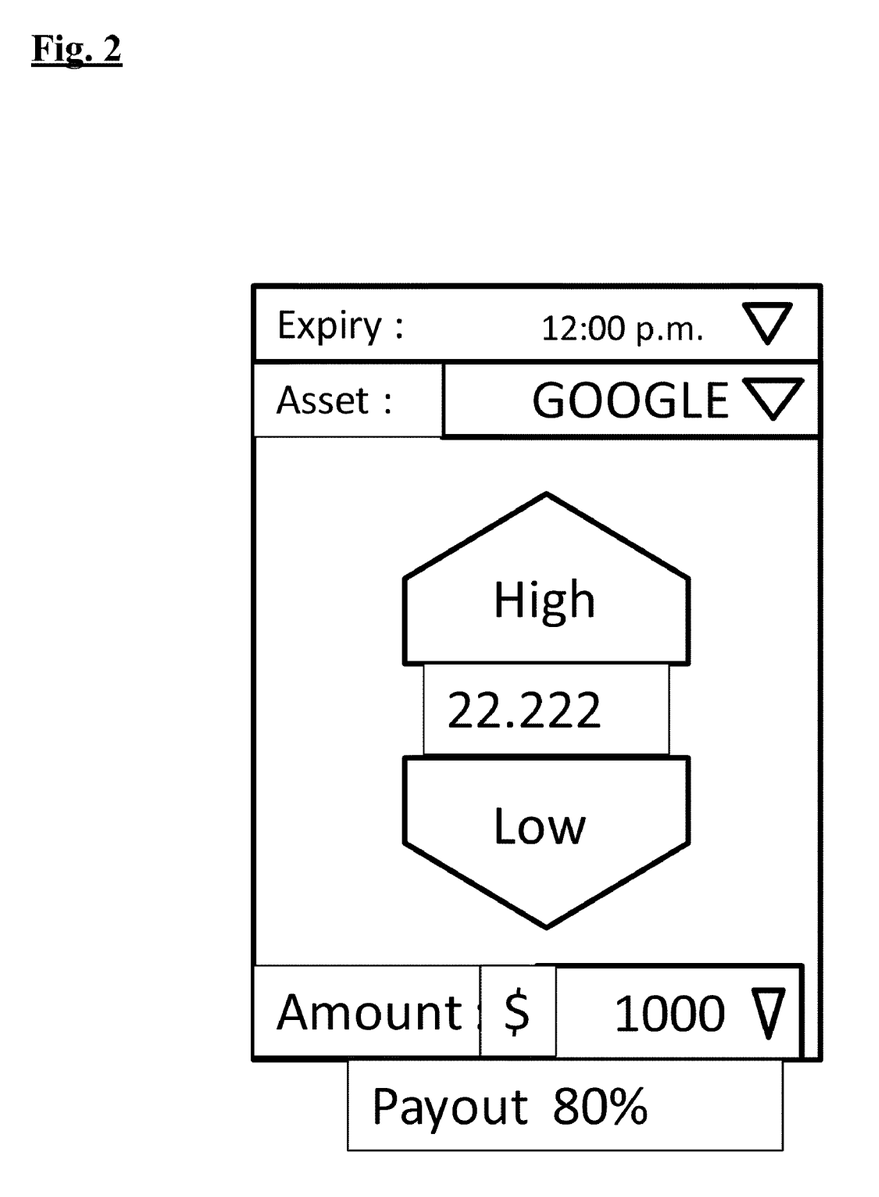
FIG. 2: is a screenshot of an exemplary display for the trade of a single exotic option, in accordance with some embodiments of the present invention.

According to some embodiments of the present invention, the platform presented to the user may include options for the user to trade in Exotic F.I.s, such as binary options. The platform may allow a user to first define parameters relating to the Exotic F.I. he wishes to trade and accordingly calculate, possibly in conjunction with the F.I. related data analyzer the possible outcomes of the prospective trade. Parameters relating to the Exotic F.I. may include: (1) the expiration time, (2) the amount traded, i.e. amount risked, (3) the nature of the option, i.e. call or put, (4) the type of option, e.g. binary, (5) the underlying asset, e.g. Google and (6) any other relevant parameter. For example, a user may define Google as the underlying asset, 12 p.m. as the expiration time, a binary call type option and 1000$ as the risked amount. Once the trade parameters are defined, the IS1 may allocate an identifier to the defined trade and may provide the user with a display containing the defined parameters, relevant market data, e.g. the current price of the underlying asset, possible outcomes of the prospective trade, and a control element associated with the identifier for execution of the defined trade. Returning to the previous example, the IS1 and/or F.I. related data analyzer may calculate that for this trade the profit will be 800$ if the price of Google is above its current price at 12 p.m. Alternatively, the profit may be displayed as a percentage, i.e. 80%, or the user may be allowed to select the form of display he desires, i.e. percentage or amount. In the above example the IS1 may then provide a display as seen in FIG. 2.

While presenting the resulting display, the platform may be adapted to allow a user to edit the defined parameters. In response, the IS1 may allocate a new identifier to the newly defined trade and update the possible outcomes of the trade accordingly.

Within the resulting display there may also be a control element, such as a button, associated with the trade identifier, which control element may serve for the user to instruct the system to execute the trade in accordance with the defined parameters.

Figure 3:
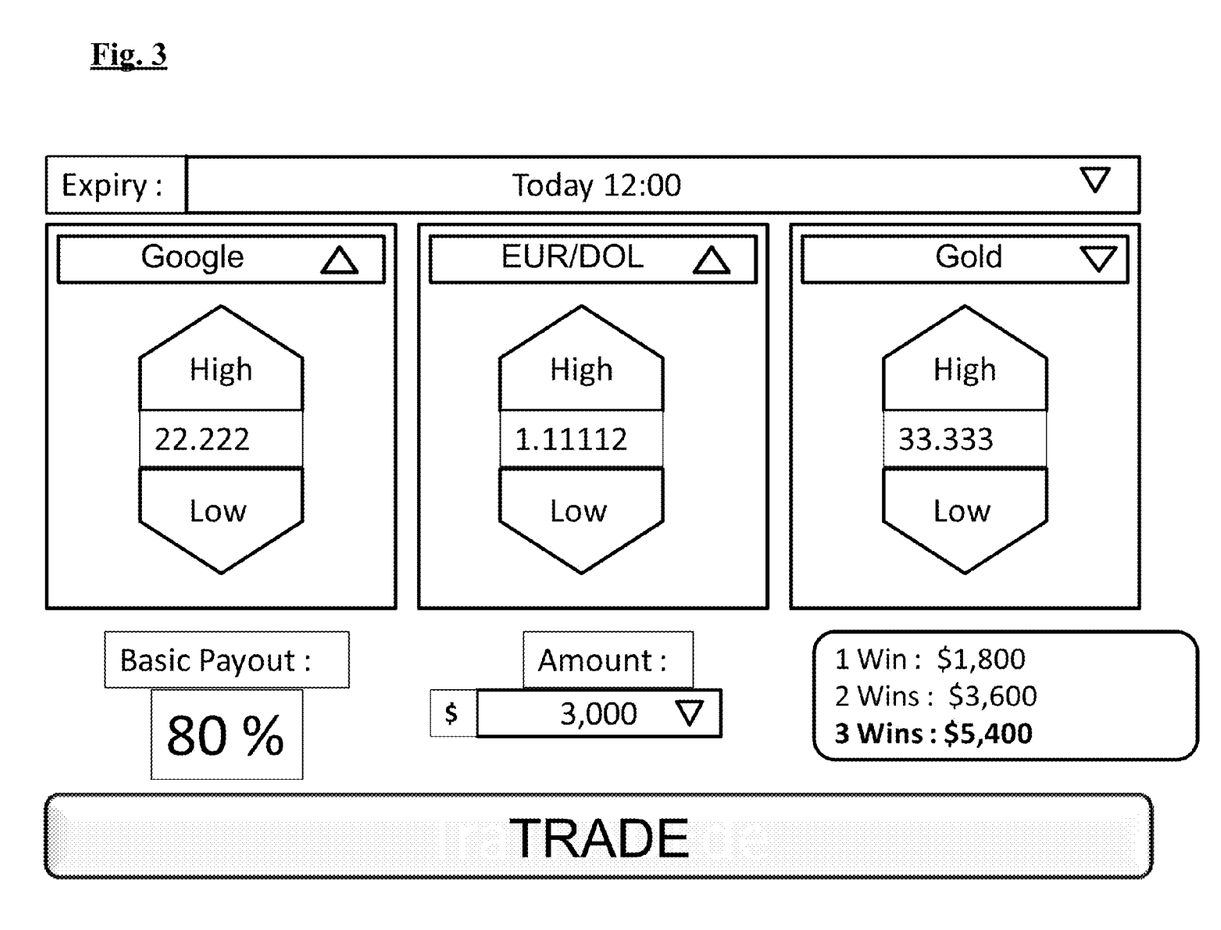
FIG. 3: is a screenshot of an exemplary display for the trade of multiple exotic options, in accordance with some embodiments of the present invention.
Figure 4:
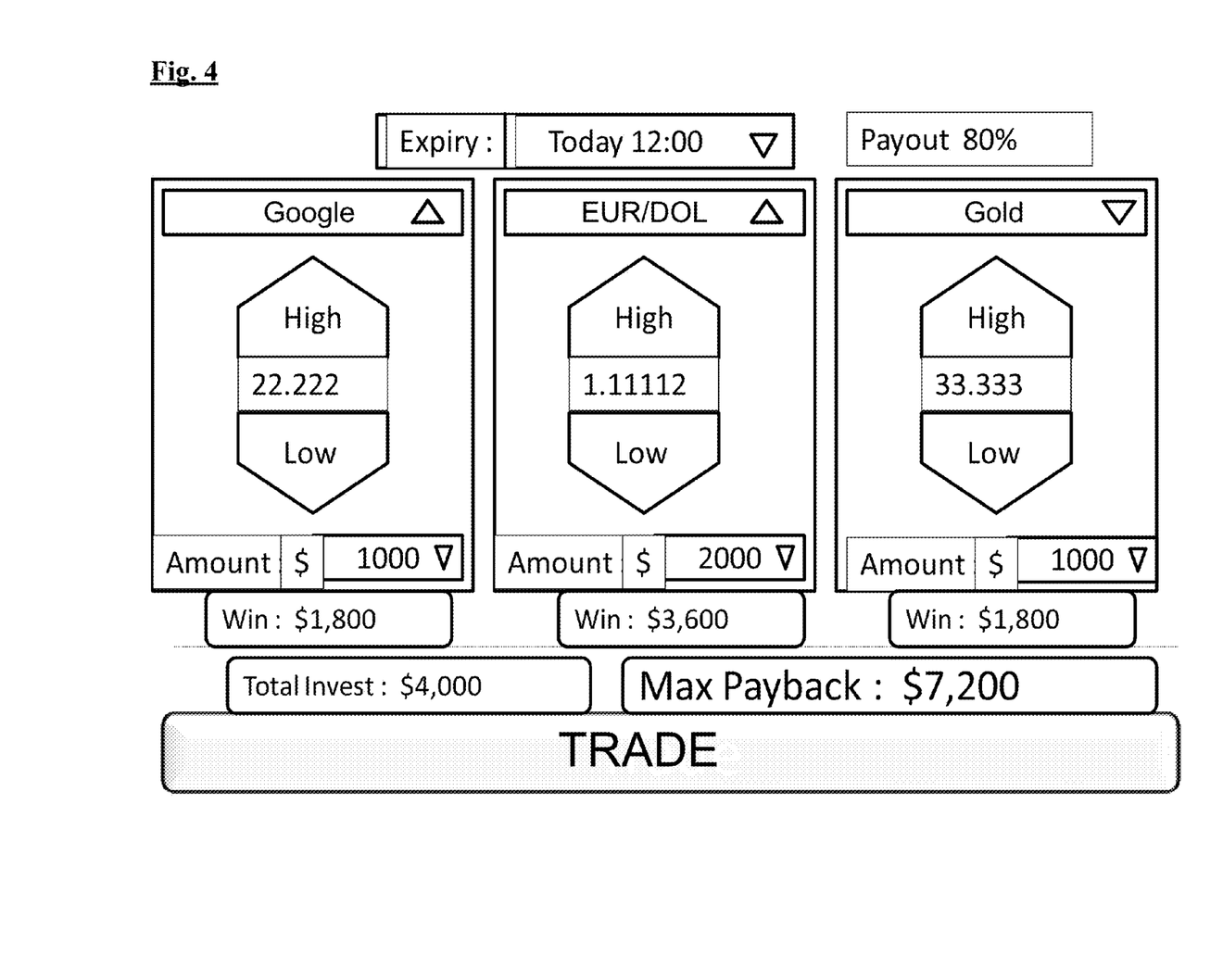
FIG. 4: is a screenshot of an exemplary display for the trade of multiple exotic options for different amounts, in accordance with some embodiments of the present invention.

According to further embodiments of the present invention, the platform may provide for the user to define multiple trades to be executed simultaneously (a "Batch" of trades), which trades may include one or more common parameters, such as a common expiration time. For example, the user may be able to define 3 exotic options/contracts to be traded, all of which will expire at 12 p.m., however, one being a binary call type option with Google as the underlying asset, one being a binary call type option with EURO/USD as the underlying asset and one being a binary put type option with Gold as the underlying asset. In such cases, the IS1 may allocate a "Batch" identifier to the defined trades, provide the user with a display including the defined parameters for each of the multiple trades, relevant market data, e.g. the current price of all of the underlying assets, the possible outcomes of each of the prospective trades and a control element associated with the batch identifier for execution of the defined trades. An exemplary display of this option can be seen in FIGS. 3+4. The platform may further provide the user with aggregate data of possible outcomes of the multiple trades in unison, i.e. the possible profit if one of the trades succeeds, two succeed, three succeed, etc. In batch trades, the platform may provide for the user to define the amount risked in each trade and/or may provide for the user to define a total amount risked for all the trades. When the user defines the total amount risked in all the trades, the platform may divide the total amount risked equally amongst all the trades. For example, if a user defines three trades to be executed as a batch risking a total of 3,000$, the platform may define each of the three trades as risking 1,000$. In response to a user interaction with the control element associated with the batch identifier, the IS1 may be adapted to cause the trading module to execute all of the trades defined in the batch substantially simultaneously.

Figure 5:
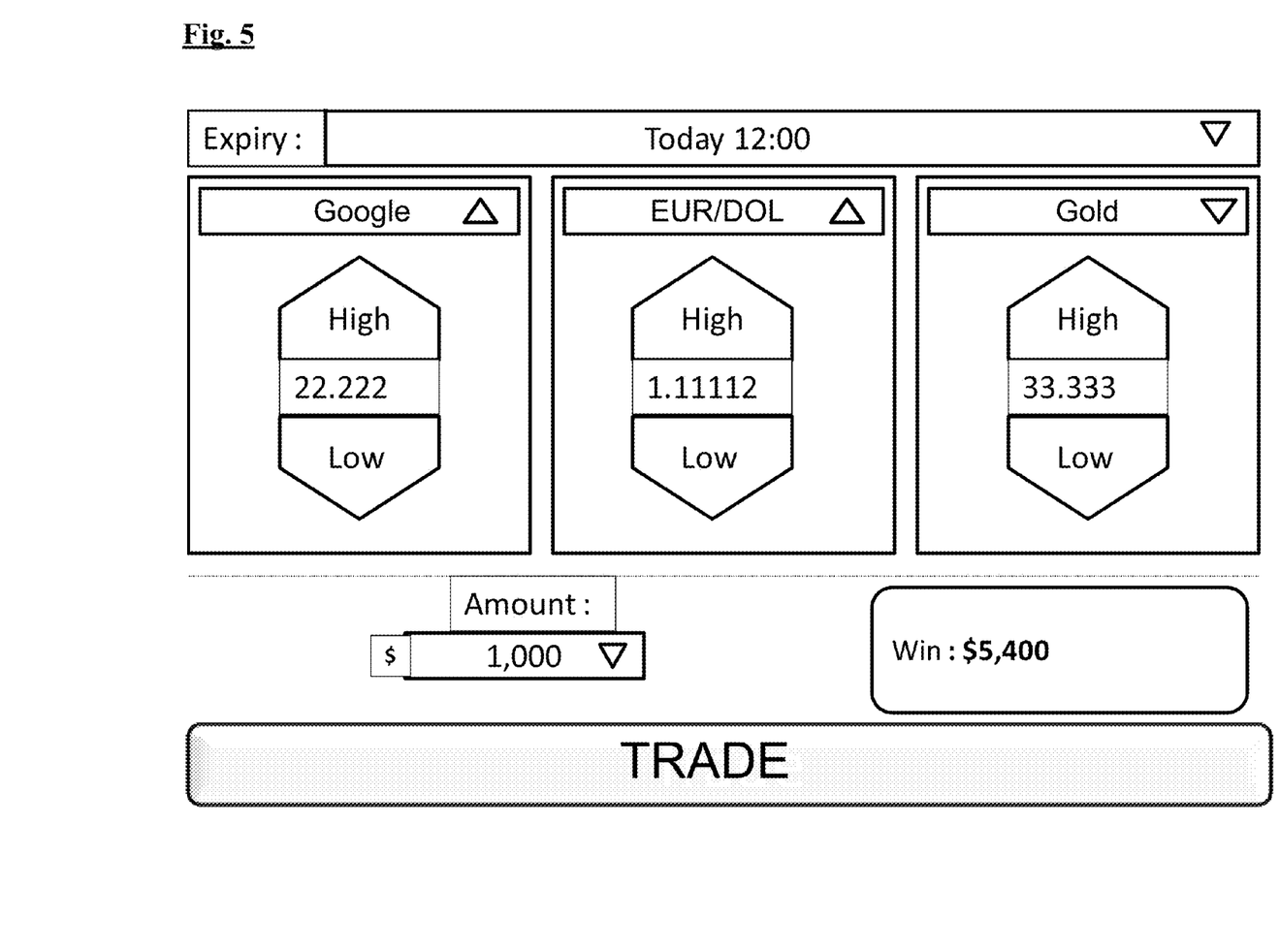
FIG. 5: is a screenshot of an exemplary display for the trade of parlayed multiple exotic options, in accordance with some embodiments of the present invention.
Figure 6:
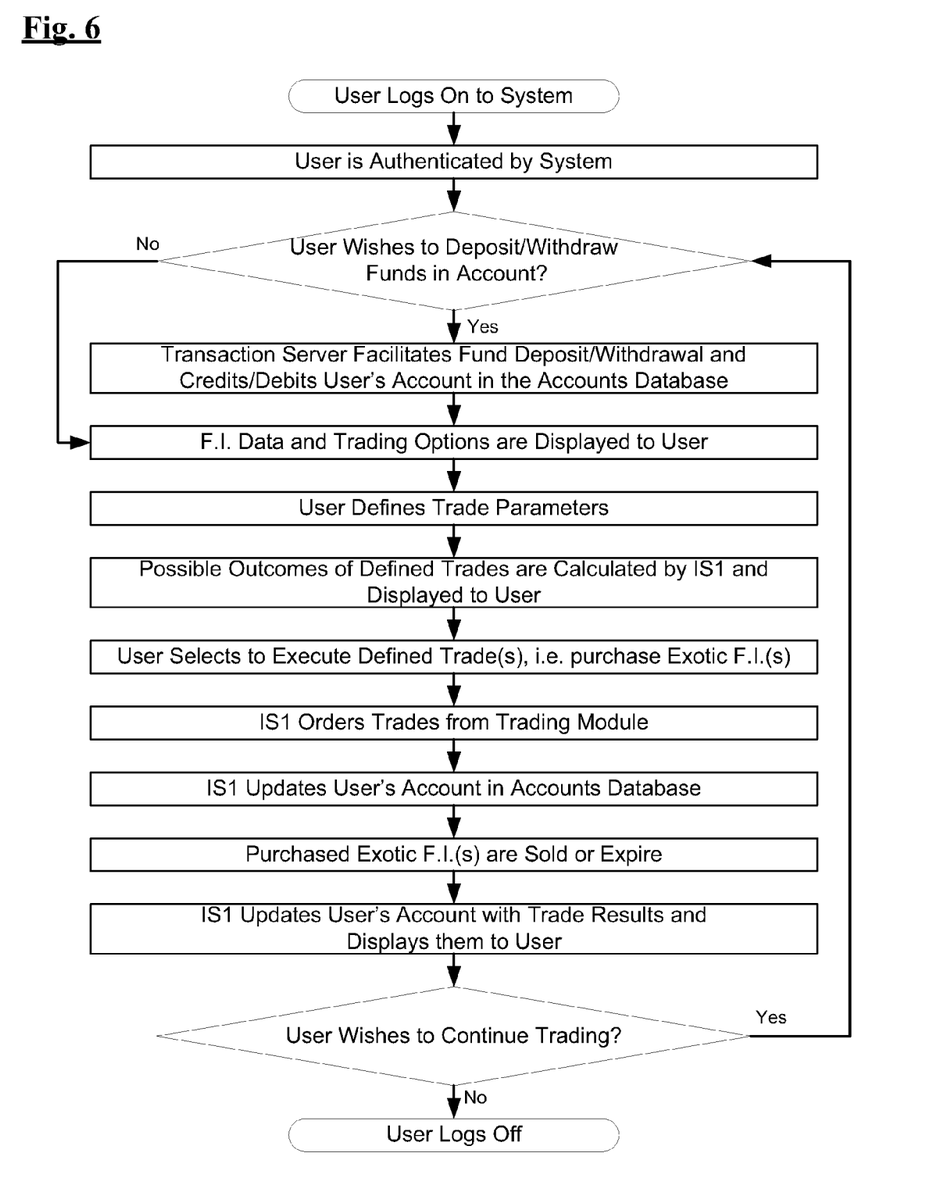
FIG. 6: is a flowchart of steps of an exemplary method for providing a platform for the trade of exotic options, in accordance with some embodiments of the present invention.

According to yet further embodiments of the present invention, the platform may allow the user to parlay multiple trades so that only if all of the trades (a classic parlay) or a certain pre-defined portion of the parlayed trades (known as a "Round Robin") are successful will there be a profit. In these cases the IS1 may allocate a "Parlay" identifier to the combination of defined trades. The profit for such a trade may be higher than the profit would be if each of the trades was executed separately. For a classic parlay type trade, the profit for a successful trade, i.e. all the parlayed trades were successful, will be calculated based on the odds of the required amount of trades succeeding, taking into account the "house" commission. Therefore, the profit for a classic parlay including N trades, if the profit would be 0.8 to 1 for each of the trades individually, will be 1.8 to the N power minus 1 multiplied by the amount risked. For example, if a user successfully parlays 2 trades risking 100$, each of which would pay 80$ if executed separately, his/her profit will be (1.8×1.8)−1=224$. An exemplary display of this option can be seen in FIG. 5. For example, a user may define a classic parlay type trade parlaying a binary call type option with Google as the underlying asset, a binary call type option with EUR/USD as the underlying asset and a binary put type option with Gold as the underlying asset, with all three expiring at 12 p.m. In this case, the user will only profit if at 12 p.m. the price of Google is higher than the current price, and the price of EUR/USD is higher than the current price and the price of Gold is lower. The user's profit, however, for this trade may be 483% (1.8×1.8×1.8-1) of the risked amount as opposed to 80% if the trades were executed separately. In a further example, a user may define the same three trades in a "round robin" type parlay, with two trades being the necessary number of successful trades. In this case the user will profit if at least two of the three trades are successful. It should be understood by one of ordinary skill in the art that other combinations of trades and dependencies of their outcomes may be provided and profits calculated accordingly.

According to further embodiments of the present invention, the platform may also provide for a user to extend/shorten the expiration time of an Exotic F.I. already purchased for a fee, which fee may be pre-defined or calculated specifically for each instance. For example, a user may select to close a trade based on the current price of an underlying asset of a purchased exotic F.I. instead of the price at the pre-defined expiration time—a "Close Now" option. Conversely, a user may choose to extend the expiration time of a purchased exotic F.I. if that time is approaching and the price of the underlying asset is not where he/she would like it to be. For example, if a user has purchased an exotic option of the binary call type with a 12 p.m. expiration time, and at 11 a.m. the user sees that the price of the underlying asset is still below the strike price, he/she may decide to extend the expiration time to 1 p.m.

According to yet further embodiments of the present invention, the platform may also include a "Rollover" option, which may allow a user to order a sequence of similar or identical trades to be executed consecutively, wherein the user may define the number of trades to be executed sequentially or may define a target profit and instruct the system to continue executing the defined trade sequentially, using all the acquired funds each time, until the target profit is gained or all the money risked is lost. Obviously, for such an option, the expiration time must be defined as an interval (e.g. every hour or every day at 12 p.m., etc.) and not as a specific time. For example, a user may instruct the system to purchase a binary call type option with Google as the underlying asset every hour, risking 1000$ and with a target profit of 5000$. The system will then continue purchasing such an option for the user every hour, risking both the 1000$ and any profit gained along the way each time, until either all the funds are lost or a total of 5000$ has been gained. Similarly, a user may instruct the system to execute the trade 5 times in a row and then stop. In this case, the IS1 may execute the defined trade 5 times consecutively, risking both the originally risked funds plus/minus any profit/loss gained/sustained along the way each time. The IS1 may assign a "Series" identifier to trades defined as rollover type trades, and present to the user a display including the defined parameters, possible outcomes and a control element associated with the series identifier for execution of the sequence of trades.

In response to a user interacting with a control element associated with a trade identifier (incl. batch or series identifiers) the IS1, possibly in conjunction with the trading module, may be adapted to facilitate, trade of any F.I., including exotic F.I.'s on any one of a selection of exchanges where said F.I. is traded. For this purpose, the IS1 may be adapted to communicate, through a communication application (e.g. VPN, etc.) or an application programming interface ("API"), via the gateway, with: (1) a broker, (2) financial institutions, (3) market data providers, and/or (4) a trading module.

The IS1 may be further adapted to communicate, possibly via the trading module, trade instructions to brokers. The trading module may also be adapted to serve as a broker itself, i.e. trade directly on an exchange. For this purpose the trading module may be associated with one or more trading accounts, maintained by a broker or directly with a F.I. exchange.

It is further noted that trades made in accordance with the teachings of this invention may be implemented in different ways, such as, but not limited to, trading on the system without actually trading on the market; building positions on the market that represent trader actions ordinary trading on the market and/or any combination thereof.

Actions taken by the user within the platform may be translated by the IS1 into trade orders, which trades orders may then be performed by: (1) ordering the trades from a broker and/or (2) directly by the trading module. Orders for trade of Exotic F.I.s may be performed by trading the same Exotic F.I.s on an appropriate exchange or the IS1, possibly in conjunction with the F.I. related data analyzer and/or the trading module, may be further adapted to generate a set of automated trade orders (e.g. buy order, sell order, stop order, etc.), collectively referred to as a trading strategy, corresponding to a user input/trade within the platform. In this case, the IS1 may communicate trade instructions of other F.I.'s to brokers and/or the trading server, so as to build positions in the market equivalent to the Exotic F.I.s traded—i.e. to purchase, sell or otherwise trade F.I.'s so that any gains or losses accrued by the user in the trade will be gained or lost in the market.

The IS1 may be further adapted to calculate the taxes owed by the user for any profits gained while trading on the system and may be even further adapted to withhold these taxes from the user's account.

While trading, a user may be accorded "leverage" by the system based on: (1) the funds he/she has deposited, (2) the specific Exotic F.I. being traded, (3) the quantity of the Exotic F.I. being traded, (4) the amount risked in a specific trade (5) pre-defined criteria, and/or (6) by specific allowance from an administrator of the system or his/her agent. According to further embodiments of the present invention, the system may be associated with security accounts, which security accounts may be dedicated to secure greater leverage from brokers when trading F.I.'s via said brokers, i.e. augmenting the user's deposited funds in order to obtain a larger "margin". Assume, for example, that a broker would normally allow a trader to purchase gold for 100$ for every 1$ he/she has as security in his/her account, i.e. 1:100 leverage. Therefore, a user who has 50$ in his/her account would be able to purchase gold for up to 5,000$. Let us further assume, however, that the system's proprietor maintains, for this purpose, a large security account with the broker, say 50,000$. In this situation the user of the system may be allowed to purchase gold for 200$ for every 1$ he/she has as security in his/her account, i.e. 1:200 leverage. Thus, a user who has 50$ in his/her account would be able to purchase gold for up to 10,000$, with both his 50$ and 50$ of the system's proprietor's security account serving as security for the broker, who is then still only allowing 1:100 leverage. In this fashion one security account can serve to augment the leverage of many users simultaneously. By maintaining said security account the system may be able to offer users greater leverage than is customary in the market.

The IS1 may be further adapted to create and maintain on an associated database functionally associated with the IS1 (an "accounts database"), accounts for users. The accounts database may contain, for each account, identifying data of the specific user, the funds he/she has available in his/her account and, possibly, historical data relating to the account, e.g. a transaction history. The IS1 may be adapted to update the data contained within the accounts database based on a user's activity/trading on the platform. The IS1 may be further associated with a transaction server adapted to facilitate monetary transactions between a user and the system, i.e. deposit and withdrawal of funds to/from his/her account.

According to some embodiments of the present invention, the transaction server may be adapted to communicate, over a data network, with financial institutions, including credit providers, to facilitate transactions.

The transaction server may be further adapted to facilitate payouts to a user of a remaining balance in his/her account in any known form of payment, either directly or via an agent, including but not limited to transferring the funds to the user's bank/credit/trading account with an external financial institution or credit provider.

It should be understood by one of skill in the art that some of the functions described as being performed by a specific component of the system may be performed by a different component of the system in other embodiments of this invention.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

I claim:

1. A method of facilitating automated exotic options trading comprising:
    receiving from a user, via a graphic user interface (GUI), parameters defining one or more exotic option trades,
    allocating by associated processing circuitry an identifier to the one or more user defined exotic option trades;
    rendering and displaying, within the GUI, possible outcomes of the one or more user defined exotic option trades;
    receiving, via the GUI, from the user an instruction to perform an exotic option trade one or more times consecutively until a pre-defined condition is met;
    allocating, by the associated processing circuitry, a series identifier to the user defined exotic option trade to be executed consecutively; and
    in response to a user interaction with a control element within the GUI associated with the allocated series identifier,
    executing, by an associated server, the user defined exotic option trade substantially consecutively, until the pre-defined condition is met,
    wherein each trade associated with the series identifier is executed consecutively with all funds resulting from a previous trade.

2. The method according to claim 1, wherein:
    two or more exotic option trades are defined by the user to be executed as a batch;
    said allocated identifier is a batch identifier; and
    wherein, in response to a user interaction with a control element associated with the batch identifier, each of said two or more user defined exotic option trades are executed substantially simultaneously.

3. The method according to claim 2, wherein the two or more user defined exotic option trades include at least one common parameter.

4. The method according to claim 3, wherein a common exotic option trade parameter is defined for all the trades in the batch in response to a user interaction with a single control element.

5. The method according to claim 2, wherein allocating a batch identifier is performed responsive to a user interaction indicating an intent to perform a batch transaction.

6. The method according to claim 1, wherein the pre-defined condition is a number of consecutive trades to be executed.

7. The method according to claim 1, wherein the pre-defined condition is a maximum or minimum profit or loss resulting from the consecutive trades.

8. The method according to claim 1, wherein the pre-defined condition is defined by the user.

9. The method according to claim 1, wherein, in response to a user interaction, an expiration time of a previously executed exotic option trade can be changed.

10. The method according to claim 1, further comprising receiving an instruction from the user to parlay two or more exotic option trades and wherein the user will profit from the parlayed trades only if all of the parlayed trades succeed.

11. A system for facilitating exotic options trading comprising:
    a transaction server to facilitate deposits and withdrawals of funds from users' accounts;
    an accounts database, functionally associated with said transaction server to store the users' accounts;

a trading module functionally associated with said accounts database to trade exotic options using funds from the users' accounts;

an interfacing server, functionally associated with said trading module to:

a. receive from a user parameters defining one or more exotic option trades;

b. allocate an identifier to the one or more user defined exotic option trades;

c. display to the user possible outcomes of the one or more user defined exotic option trades;

d. receive from the user an instruction to perform an exotic option trade one or more times consecutively until a pre-defined condition is met;

e. allocate a series identifier to the exotic option trades defined by the user to be executed consecutively; and f. in response to a user interaction with a control element associated with the series identifier, cause said trading module to execute the user defined exotic option trade substantially consecutively, until the pre-defined condition is met, wherein each trade is executed consecutively with all funds resulting from a previous trade.

12. The system according to claim 11, wherein the interfacing server is further adapted to:

a. allocate a batch identifier to two or more exotic option trades defined by the user to be executed as a batch; and b. cause said trading module to execute each of the two or more user defined exotic option trades substantially simultaneously, in response to a user interaction with a control element associated with the batch identifier.

13. The system according to claim 12, wherein the interfacing server is further adapted to define a common exotic option trade parameter for all the trades in the batch in response to a user interaction with a single control element.

14. The system according to claim 11, wherein the pre-defined condition is a number of consecutive trades to be executed.

15. The system according to claim 11, wherein the pre-defined condition is a profit or loss resulting from the consecutive trades.

16. The system according to claim 11, wherein the interfacing server is further adapted to change an expiration time of a previously executed exotic option trade, in response to a user interaction.

17. The system according to claim 11, wherein the interfacing server is further adapted to receive an instruction from a user to parlay two or more exotic option trades and wherein the user will profit from the parlayed trades only if all of the parlayed trades succeed.

* * * * *